(12) United States Patent
Peng et al.

(10) Patent No.: US 9,093,907 B2
(45) Date of Patent: Jul. 28, 2015

(54) METHOD AND APPARATUS FOR STARTING UP

(71) Applicant: Marvell World Trade Ltd., Brittons Hill (BB)

(72) Inventors: Hao Peng, Sunnyvale, CA (US); Jinho Choi, Saratoga, CA (US); Biing Long Shu, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 75 days.

(21) Appl. No.: 13/828,453

(22) Filed: Mar. 14, 2013

(65) Prior Publication Data

US 2013/0242622 A1    Sep. 19, 2013

Related U.S. Application Data

(60) Provisional application No. 61/610,932, filed on Mar. 14, 2012, provisional application No. 61/661,150, filed on Jun. 18, 2012.

(51) Int. Cl.
*H02M 3/335* (2006.01)
*H05B 33/08* (2006.01)

(52) U.S. Cl.
CPC ...... *H02M 3/33507* (2013.01); *H02M 3/33523* (2013.01); *H02M 3/33546* (2013.01); *H05B 33/0815* (2013.01); *H05B 33/0848* (2013.01)

(58) Field of Classification Search
USPC ........... 363/74, 78, 81, 84, 89, 123, 124, 125, 363/126, 127, 15, 16, 20, 21.01, 21.04, 21.1
See application file for complete search history.

(56) References Cited

U.S. PATENT DOCUMENTS

| | | |
|---|---|---|
| 5,513,089 A | 4/1996 | Sudo et al. |
| 5,838,226 A | 11/1998 | Houggy et al. |
| 8,242,766 B2 | 8/2012 | Gaknoki et al. |
| 8,379,412 B2 | 2/2013 | Nakayama |
| 2010/0165668 A1* | 7/2010 | Lin ............................ 363/21.02 |
| 2010/0259196 A1 | 10/2010 | Sadwick et al. |
| 2011/0140620 A1* | 6/2011 | Lin et al. ........................ 315/224 |
| 2012/0032649 A1 | 2/2012 | Carmen |
| 2012/0056548 A1* | 3/2012 | Duan et al. ................. 315/200 R |
| 2012/0155132 A1* | 6/2012 | Uno ................................ 363/80 |
| 2012/0230073 A1 | 9/2012 | Newman, Jr. et al. |
| 2013/0336019 A1* | 12/2013 | Gaknoki et al. ........... 363/21.12 |

OTHER PUBLICATIONS

"TRIAC," from Wikipedia, the free encyclopedia (10 pp.), printed on Jan. 25, 2012.

* cited by examiner

*Primary Examiner* — Jeffrey Gblende (57) ABSTRACT

Aspects of the disclosure provide a method. The method includes receiving an input voltage rectified from an alternating current (AC) power supply, detecting a time duration that the input voltage is between a first threshold voltage and a second threshold voltage, determining a line voltage of the AC power supply based on the time duration, and regulating a time for turning on a switch to transfer energy via a transformer based on the detected line voltage.

20 Claims, 7 Drawing Sheets

METHOD AND APPARATUS FOR STARTING UP

INCORPORATION BY REFERENCE

This present disclosure claims the benefit of U.S. Provisional Application No. 61/610,932, "Start Up Method for Triac Detection and Input Line Voltage Detection for Triac Dimmable LED Driver" filed on Mar. 14, 2012, and U.S. Provisional Application No. 61/661,150, "Input Voltage Detection and Start Up Method for Triac Dimmable LED Driver" filed on Jun. 18, 2012, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, halogen lamps, and the like.

SUMMARY

Aspects of the disclosure provide a method. The method includes receiving an input voltage rectified from an alternating current (AC) power supply, detecting a time duration that the input voltage is between a first threshold voltage and a second threshold voltage, determining a line voltage of the AC power supply based on the time duration, and regulating a time for turning on a switch to transfer energy via a transformer based on the detected line voltage.

Further, in an embodiment, the method includes regulating the time for turning on the switch to transfer energy via the transformer at a power up based on an assumption that the AC power supply is a high line AC power supply with a dimmer. To regulate the time for turning on the switch to transfer energy via the transformer at the power up, in an example, the method includes regulating the time for turning on the switch to limit a substantially constant peak current at the power up. For example, the method includes generating pulses with a pulse width modulated based on a sensed current.

To determine the line voltage of the AC power supply based on the time duration, in an embodiment, the method includes determining the line voltage to be a high line voltage when a ratio of the time duration to an AC cycle is lower than a first value, and determining the line voltage to be a low line voltage when the ratio is high than a second value that is higher than the first value. Further, in an example, the method includes determining whether a dimmer exists based on the time duration. For example, the method includes determining that the dimmer exists when the time duration is smaller than a threshold, such as about zero.

Aspects of the disclosure provide a circuit that includes a detector and a controller. The detector is configured to receive an input voltage rectified from an alternating current (AC) power supply, and detect a time duration that the input voltage is between a first threshold voltage and a second threshold voltage. The controller is configured to determine a line voltage of the AC power supply based on the time duration and regulate a time for turning on a switch to transfer energy via a transformer based on the detected line voltage.

Aspects of the disclosure also provide an apparatus that includes an energy transfer module, a detector and a controller. The energy transfer module is configured to transfer electric energy from an AC power supply to an output device. The detector is configured to receive an input voltage rectified from the alternating current (AC) power supply, and detect a time duration that the input voltage is between a first threshold voltage and a second threshold voltage. The controller is configured to determine a line voltage of the AC power supply based on the time duration and regulate a time for turning on a switch of the energy transfer module to transfer energy via a transformer based on the detected line voltage.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
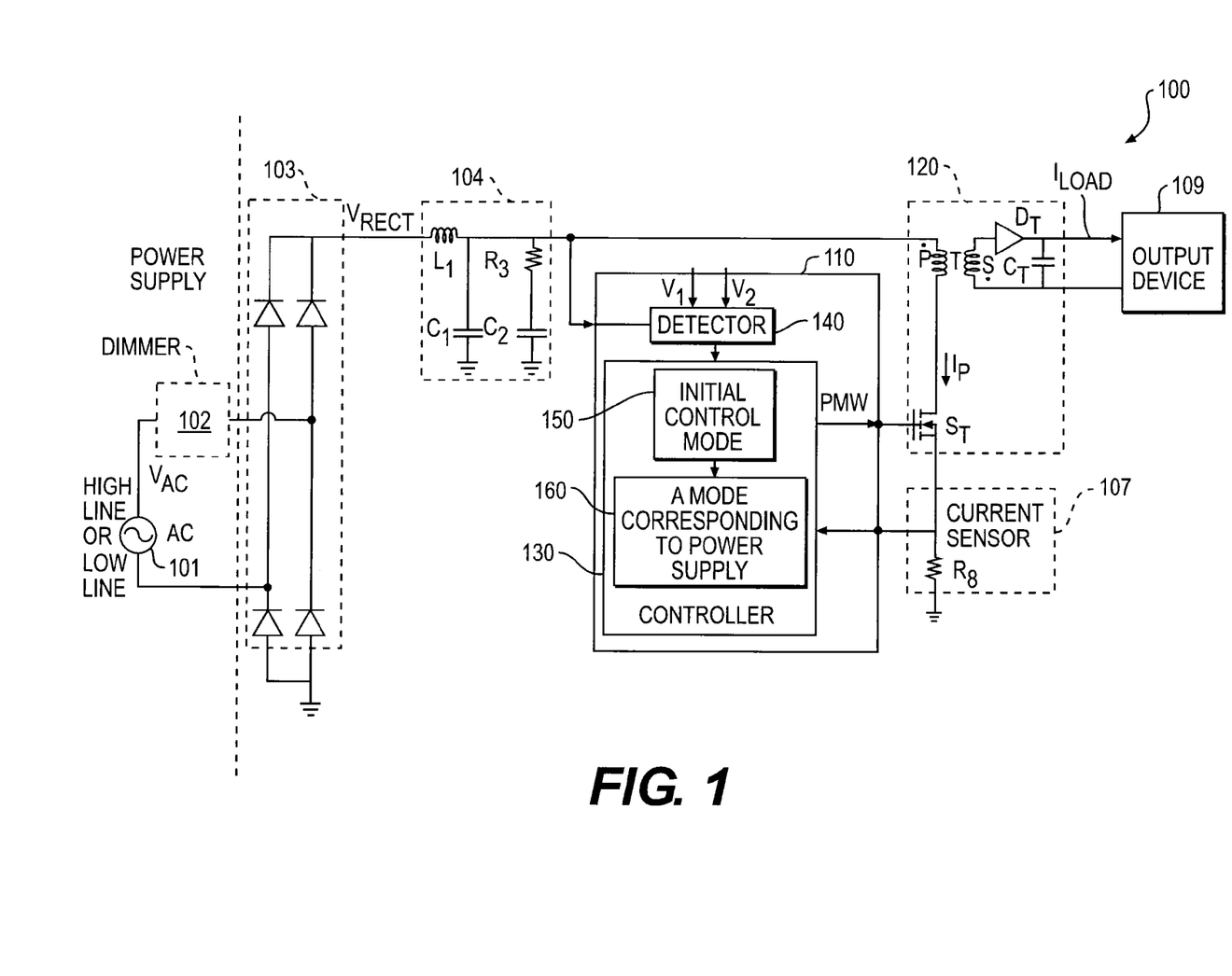
FIG. 1 shows a block diagram of an electronic system 100 according to an embodiment of the disclosure.

FIG. 1 shows a block diagram of an electronic system 100 according to an embodiment of the disclosure. The electronic system 100 operates based on an alternating current (AC) voltage $V_{AC}$ provided by an AC power supply 101 with or without a dimmer 102 The AC power supply 101 can be a low line power supply or can be a high line power supply. Generally, when the AC power supply 101 is the low line power supply, the root-mean-square (rms) voltage of the AC voltage $V_{AC}$ is in the range of 90~135V; and when the AC power supply 101 is the high line power supply, the root-mean-square voltage of the AC voltage $V_{AC}$ is in the range of 190~265V.

According to an aspect of the disclosure, the electronic system 100 is operable under various power supplies. For example, the low line power supply and the high line power supply are used by different countries. The electronic system 100 can operate in the different countries under the low line power supply or the high line power supply. In addition, a power supply may or may not have a pre-installed dimmer 102, the electronic system 100 is operable with or without a dimmer 102.

According to an aspect of the disclosure, the electronic system 100 is configured to enter an initial operation mode at a power up. In the initial operation mode, in an example, the electronic system 100 operates in a manner that is safe for any power supply. Further, in the initial operation mode, the electronic system 100 detects attributes of the power supply, such as the line voltage of the power supply, dimmer existence, and the like. Based on the attribute detection, the electronic system 100 enters an operation mode corresponding to the detected power supply. In the operation mode corresponding to the power supply, the electronic system 100 operates in a manner to optimize the performance of the electronic system 100 under the detected power supply.

Specifically, the electronic system 100 is operable with or without a dimmer 102. In an example, when a dimmer 102 exists, the dimmer 102 includes a triode for alternating current (TRIAC) having an adjustable dimming angle α. The dimming angle α defines a size of a phase-cut range during which the TRIAC is turned off. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range, the TRIAC is turned on. Thus, the output voltage of the dimmer 102 is about the same as the AC voltage $V_{AC}$.

In an embodiment, the electronic system 100 is configured to detect whether the dimmer 102 exists, and to operate accordingly to achieve improved performance in either situations. For example, when the dimmer 102 exists, the electronic system 100 is configured to support the operations of the dimmer 102, such as disclosed in Assignee's co-pending U.S. patent application Ser. No. 13/676,884, filed Nov. 14, 2012, which is incorporated herein by reference in its entirety. When the dimmer 102 does not exist, the electronic system 100 is configured to perform power factor correction (PFC) and total harmonic distortion (THD) reduction to improve energy efficiency, for example.

According to an embodiment of the disclosure, the electronic system 100 has multiple operation modes corresponding to different power supplies, such as a mode for low line no TRIAC power supply, a mode for high line no TRIAC power supply, a mode for power supply with TRIAC, and the like. In different control modes, the electronic system 100 can execute different control algorithms or have different values for control parameters. The control algorithm and the values for the control parameters in each mode are determined to optimize the operations of the electronic system 100 under the corresponding power supply. For example, when the dimmer 102 exists, the electronic system 100 operates in the mode for power supply with TRIAC to support the operations of the dimmer 102. When the dimmer 102 does not exist, the electronic system 100 operates in the mode for high line no TRIAC power supply when the AC power supply 101 is a high line power supply, and operates in the mode for low line no TRIAC power supply when the AC power supply 101 is a low line power supply to perform power factor correction and total harmonic distortion reduction and thus improve energy efficiency.

It is noted that, in an example, the control algorithm and values for the control parameters of the initial operation mode are determined to be safe for any power supply and can enable the electronic system 100 to smoothly switch into the operation mode suitable for the corresponding power supply. In an example, at a power-up, the electronic system 100 enters the initial operation mode assuming that the dimmer 102 exists, and assuming the AC power supply 101 is a high line power supply. It is noted that when the dimmer 102 does not exists or the AC power supply 101 is a low line power supply, the electronic system 100 is operable in the initial operation mode, but may have a relatively low power factor and a relatively large total harmonic distortions. When the electronic system 100 detects attributes of the power supply, such as the line voltage of the power supply, with/without the dimmer 102, the electronic system 100 switches into the mode corresponding to the power supply with suitable values for the operational parameters to enable a smooth transition from the initial operation mode to the mode corresponding to the power supply, for example, without being noticeable to a user.

In the FIG. 1 example, the electronic system 100 includes a rectifier 103, a damping circuit 104, a circuit 110, an energy transfer module 120, a current sensor 107, and an output device 109. These elements are coupled together as shown in FIG. 1.

The rectifier 103 rectifies an AC voltage to a fixed polarity, such as to be positive. In the FIG. 1 example, the rectifier 103 is a bridge rectifier. The bridge rectifier 103 receives the AC voltage, or the output voltage of the dimmer 102, and rectifies the received voltage to a fixed polarity, such as to be positive. The damping circuit 104 is configured to filter out high frequency components and smooth the rectified voltage $V_{RECT}$. The rectified voltage $V_{RECT}$ is provided to following circuits, such as the circuit 110, the energy transfer module 120, and the like, in the electronic system 100.

The energy transfer module 120 transfers electric energy provided by the rectified voltage $V_{RECT}$ to the output device 109 under the control of the circuit 110. In the FIG. 1 example, the energy transfer module 120 includes a transformer T and a switch $S_T$. The energy transfer module 120 also includes other suitable components, such as a diode $D_T$, a capacitor $C_T$, and the like. The transformer T includes a primary winding (P) coupled with the switch $S_T$ to receive the rectified voltage $V_{RECT}$ and a secondary winding (S) coupled to the output device 109 to drive the output device 109.

In an embodiment, the circuit 110 provides control signals to control the operations of the switch $S_T$ to transfer the electric energy from the primary winding to the secondary winding. In an example, the circuit 110 provides a pulse width modulation (PWM) signal with pulses having a relatively high frequency, such as in the order of 100 KHz, and the like, to control the switch $S_T$.

Specifically, in an example, when the switch $S_T$ is switched on, a current $I_P$ flows through the primary winding of the transformer T, and the switch $S_T$. The polarity of the transformer T and the direction of the diode $D_T$ can be arranged such that there is no current in the secondary winding of the transformer T when the switch $S_T$ is switched on. Thus, the received electric energy is stored in the transformer T.

When the switch $S_T$ is switched off, the current $I_P$ becomes zero. The polarity of the transformer T and the direction of the diode $D_T$ can enable the secondary winding to deliver the stored electric energy to the capacitor $C_T$ and the output device 109. The capacitor $C_T$ can filter out the high frequency components and enable a relatively stable load current $I_{LOAD}$ to be driven to the output device 109.

The output device 109 can be any suitable device, such as a lighting device, a fan and the like. In an embodiment, the output device 109 includes a plurality of light emitting diodes (LEDs). The output device 109 and the other components of the electronic system 100 are assembled into a package to form an LED lighting device to replace, for example, a fluorescent lamp, a halogen lamp, and the like.

The current sensor 107 is configured to sense the current $I_P$ flowing through the primary winding, and provide the sensed current to the circuit 110. In an example, the current sensor 105 includes a resistor $R_S$ having a relatively small resistance such that a voltage drop on the resistor $R_S$ is small compared to the rectified voltage $V_{RECT}$. The voltage drop is indicative of the current $I_P$. In an example, the voltage drop is provided to the circuit 110 as the sensed current.

According to an embodiment of the disclosure, the circuit 110 monitors the input voltage, such as the rectified voltage $V_{RECT}$, the voltage level at the input of the energy transfer module 120, and the like, compares the input voltage with two threshold voltages, and detects the attributes of the power supply based on the comparison.

According to an embodiment of the disclosure, the circuit 110 includes a detector 140 and a controller 130. The detector 140 is configured to receive the input voltage, compare the input voltage with two threshold voltages V1 and V2, and detect various attributes, such as the line voltage, existence of a TRIAC type dimmer, and the like based on the comparisons. The controller 130 is configured to adjust control signals, such as the PWM signal, and the like, based on the detected attributes to control the operations of the energy transfer module 120.

Specifically, in an example, the controller 130 has multiple control modes that generate the PWM signal according to different algorithms or different values of control parameters. In an example, the controller 130 has a mode for power supply with TRIAC that generates the PWM signal according to a first algorithm. Further, the controller 130 has a mode for high line no TRIAC power supply and a mode for low line no TRIAC power supply that generate the PWM signal according to a second algorithm but with different values for control parameters. In this example, the first algorithm is used to generate the PWM signals to enable the operations of the dimmer 102, and the second algorithm is used to generate the PWM signal to achieve improved power factor and total harmonic distortion when the dimmer 102 does not exist.

In an embodiment, according to the first algorithm, the controller 130 provides the PWM signal to the switch $S_T$ to maintain a relatively constant peak current in the primary winding when the TRIAC in the dimmer 102 is turned on. In an example, when the controller 130 detects that the TRIAC in the dimmer 102 is turned on, the controller 130 provides the PWM signal to the switch $S_T$ to repetitively turn on and off the switch $S_T$ to maintain the relatively constant peak current. For example, at a time, the controller 130 changes the PWM signal from "0" to "1" to turn on the switch $S_T$. When the switch $S_T$ is turned on, the current $I_P$ starts to increase. The current sensor 107 senses the current $I_P$, for example, in a form of a voltage drop on a resistor, and provides sensed voltage drop to the controller 130. The controller 130 receives the sensed voltage drop, and changes the PWM signal from "1" to "0" to turn off the switch $S_T$ when the sensed voltage drop is substantially equal to a threshold, such as 0.4V, and the like.

Further, in the embodiment, according to the second algorithm, the controller 130 provides the PWM signal to control the switch $S_T$ to have a relatively constant turn-on time over the switching cycles in an AC cycle. For example, in an AC cycle, the PWM signal includes pulses to repetitively switch on and off the switch $S_T$. The controller 130 can maintain the pulses in the PWM signal to have the same pulse width during the AC cycle, such that the turn-on time of the switch $S_T$ over the switching cycles in the AC cycle is about the same. It is noted that, according to an aspect of the disclosure, the turn-on time in different AC cycles can be different. In an example, the turn-on time and switching frequency are fixed during an AC cycle, but are adaptively changed over time.

It is also noted that, for different line voltages, the turn-on time and the switching frequency can be different. For example, when the AC power supply 101 is a high line power supply, the controller 130 provides the PWM signals with a relatively smaller turn-on time compared to a situation when the AC power supply 101 is a low line power supply.

It is also noted that the controller 130 also controls the PWM signal based on other parameters. For example, according to the first algorithm, the controller 130 can control the PWM signal based on, for example, a maximum on time (i.e., 10 μs), a minimum frequency (i.e., 70 KHz), a maximum frequency (i.e., 200 KHz), and the like.

Further, in an example, according to the second algorithm, the controller 130 limits a maximum peak current in the primary winding. For example, the current sensor 107 senses the current $I_P$, and provides a sensed voltage drop indicative of the current $I_P$, to the controller 130. In a switching cycle, when the controller 130 changes the PWM signal from "0" to "1" to turn on the switch $S_T$, the sensed voltage drop is monitored. When the sensed voltage drop is lower than a threshold, such as 0.6V, the controller 130 changes the PWM signal from "1" to "0" to turn off the switch $S_T$ in a manner to maintain the relatively constant turn-on time. When the sensed voltage is equal or above the threshold, the controller 130 changes the PWM signal from "1" to "0" to turn off the switch $S_T$ earlier than the constant turn-on time to avoid the current $I_P$ to further increase.

In another example, according to the second algorithm, the controller 130 uses a quasi-resonant control method. According to the quasi-resonant control method, a frequency of the PWM signal is not fixed, and is synchronized with a resonance frequency governed by inductance and capacitance in the electronic system 100. In this example, a voltage across the secondary winding of the transformer T is sensed and provided to the controller 130. When the switch $S_T$ is turned off, the voltage across the secondary winding resonates. The controller 130 changes the PWM signal from "0" to "1" when the voltage across the secondary winding is at the valley.

According to an embodiment of the disclosure, in the initial operation mode, the controller 130 provides the PWM signal to the switch $S_T$ according to the first algorithm to maintain a relatively constant peak current in the primary winding assuming the dimmer 102 exists. In an example, the controller 130 adjusts the frequency for the PWM signal to control the energy transfer in the initial operation mode. For example, the controller 130 uses a relatively low frequency, for example a minimum frequency, for the PWM signal in the initial operation mode to start driving the output device 109 with a relatively low power, for example a minimum power. The frequency can be gradually increased based on the power supply attribute detection to enable a smooth turn on of the output device 109. Thus, even when the dimmer 102 exists and is at the lowest dimming position, the output device 109 can still be smoothly turned on.

Further, according to an embodiment of the disclosure, when the controller 130 operates in the initial operation mode that assumes the existence of the dimmer 102, the operations of the controller 130 reduces an input voltage offset coming from the damping capacitance in the damping circuit 104, and avoids waveform distortion, thus the circuit 110 can more accurately detect attributes of the power supply, such as the line voltage of the power supply.

According to an aspect of the disclosure, due to the difference in the control algorithms, when the controller 130 switches from one control mode to another control mode, the transition can be noticeable and can affect user experience. For example, when the dimmer 102 does not exist, the controller 130 changes from the initial control mode 150 to the control mode 160. When the two control modes control the energy transfer module 120 to deliver significantly different energy per AC cycle to the output device 109, the LEDs in the output device 109 may flash at the time of control mode transition, and cause unpleasant user experience during the transition.

It is noted that the electronic system 100 can be implemented using one or more integrated circuit (IC) chips. In an example, the circuit 110 is implemented as a single IC chip. Further, the switch $S_T$ can be implemented as a discrete device or can be integrated with the circuit 110 on the same IC chip. The controller 130 can be implemented as circuits or can be implemented as a processor executing instructions.

Figure 2:
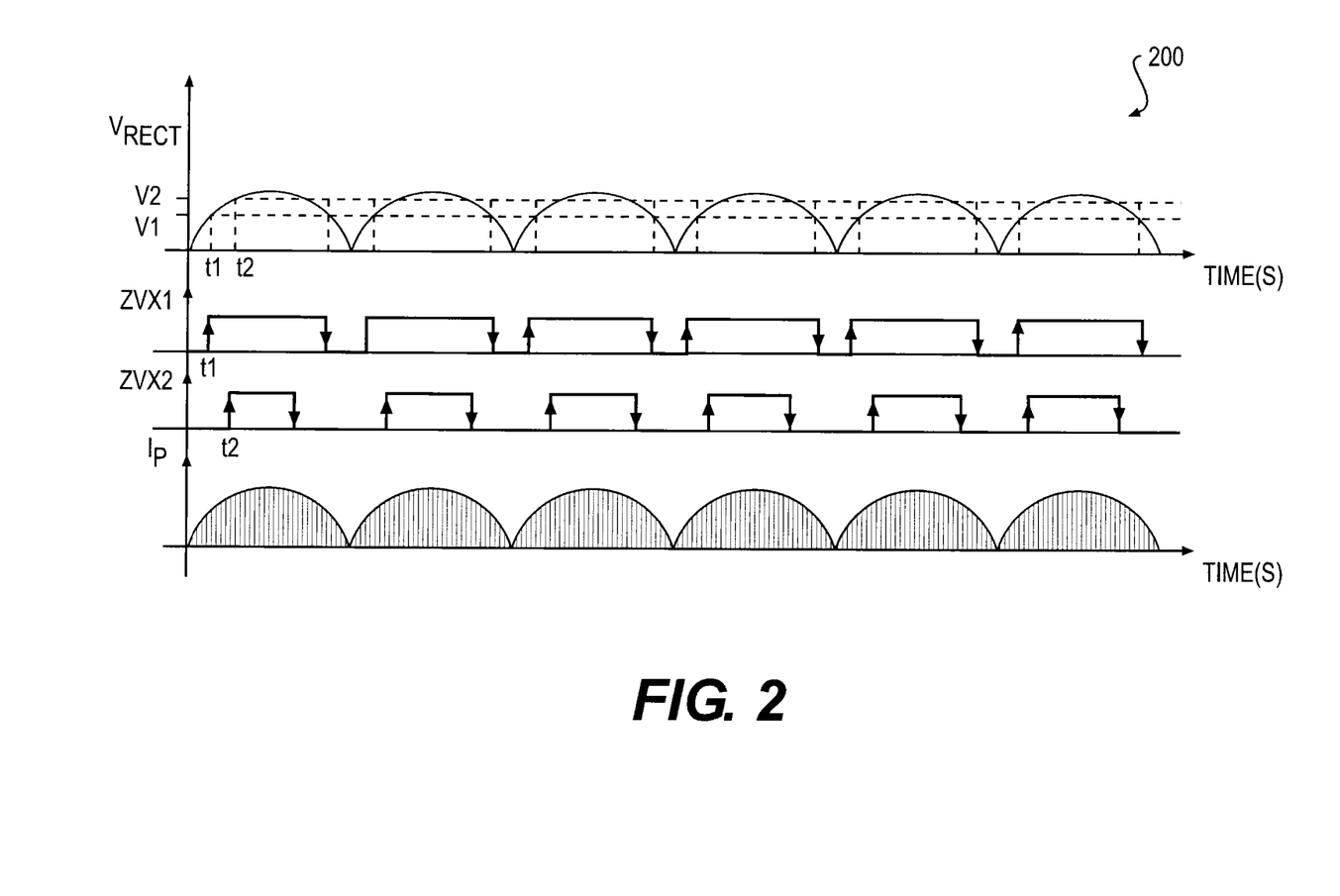
FIG. 2 shows a plot 200 of voltage and current waveforms according to an embodiment of the disclosure.

FIG. 2 shows a plot 200 of waveforms for the electronic system 100 when the dimmer 102 does not exist and the controller 130 performs the second algorithm. The plot 200 includes a first waveform for the rectified voltage $V_{RECT}$, a second waveform for a first signal ZVX1 generated based on a comparison of the rectified voltage $V_{RECT}$ with the first threshold voltage V1, a third waveform for a second signal ZVX2 generated based on a comparison of the rectified voltage $V_{RECT}$ with the second threshold voltage V2, and a fourth waveform for the current $I_P$.

The first waveform shows that the rectified voltage $V_{RECT}$ has a rectified sinusoidal curve.

In the second waveform, when the rectified voltage $V_{RECT}$ is larger than the first threshold voltage V1, the first signal ZVX1 is logic "1", and the when the rectified voltage $V_{RECT}$ is smaller than the first threshold voltage V1, the first signal ZVX1 is logic "0".

In the third waveform, when the rectified voltage $V_{RECT}$ is larger than the second threshold voltage V2, the second signal ZVX2 is logic "1", and the when the rectified voltage $V_{RECT}$ is smaller than the second threshold voltage V2, the second signal ZVX2 is logic "0".

The fourth waveform shows that the peak current of the switching cycles follows the shape of the first waveform due to the fixed turn-on time in the second algorithm during an AC cycle. Thus, the average of the current $I_P$ has substantially the same phase as the rectified voltage $V_{RECT}$, and the power factor correction can be achieved, and the energy efficiency can be improved.

According to an embodiment of the disclosure, due to the different values of the two threshold voltages V1 and V2, the rising edge transitions and falling edge transitions of the two signals ZVX1 and ZVX2 happen at different time. A timing duration between the transition time of the first signal ZVX1 and the second signal ZVX2 is related to the line voltage, such as shown in Eq. 1:

$$\frac{t_2 - t_1}{T_{Half_{cycle}}} = \frac{1}{\pi}\left[\sin^{-1}\left(\frac{V2}{\sqrt{2} \times V_{in_{rms}}}\right) - \sin^{-1}\left(\frac{V1}{\sqrt{2} \times V_{in_{rms}}}\right)\right] \quad \text{Eq. 1}$$

where $t_1$ denotes the time when the rectified voltage $V_{RECT}$ is equal to the first threshold voltage V1, and $t_2$ denotes the time when the rectified voltage $V_{RECT}$ is equal to the second threshold voltage V2, $T_{Half\_cycle}$ denotes an half of an AC cycle, and $V_{in\_rms}$ denotes root-mean-square voltage of the AC power supply. Thus, the timing duration ($t_2-t_1$) can be used to detect the line voltage. In an example, the first threshold voltage V1 is chosen to be 120V and the second threshold voltage V2 is chosen to be voltage is 140V. When the ratio of the time duration to the half of the AC cycle is smaller than 0.035 for example, the AC power supply is a high line power supply, and when the ratio of the time duration to the half of the AC cycle is larger than 0.045 for example, the AC power supply is a low line power supply.

Figure 3:
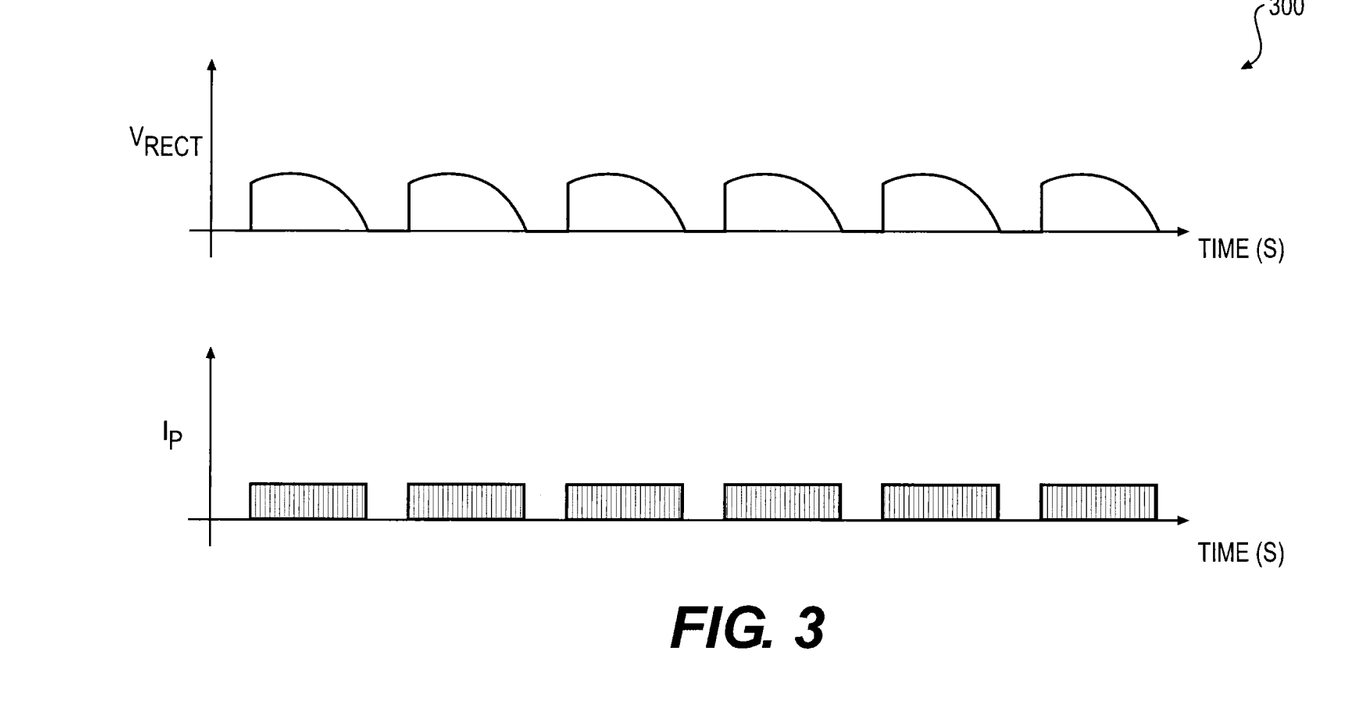
FIG. 3 shows a plot 300 of voltage and current waveforms according to an embodiment of the disclosure.

FIG. 3 shows a plot 300 of voltage and current waveforms for the electronic system 100 when the dimmer 102 exists, and the controller 130 performs the first algorithm. The plot 300 includes a first waveform for the rectified voltage $V_{RECT}$ and a second waveform for the current $I_P$.

The first waveform shows that the rectified voltage $V_{RECT}$ can be zero during a phase-cut range when the TRIAC in the dimmer 102 is turned off. The second waveform 320 shows that the peak current in the switching cycles is about the same in an AC cycle due to the constant peak current control of the first algorithm.

When the two signals ZVX1 and ZVX2 are generated similarly to the example shown in FIG. 2, due to the phase cut by the TRIAC, the rising edge transitions of the two signals ZVX1 and ZVX2 can happen at about the same time. Thus, the TRIAC existence can be detected based on the time duration between the rising edge transitions of the two signals ZVX1 and ZVX2. For example, when the time duration of the rising edge transitions of the two signals ZVX1 and ZVX2 is about zero, such as smaller than 3.2 µs, a TRIAC exists.

It is noted that, in an example, when the TRIAC is a trailing edge TRIAC, the TRIAC existence can be detected based on the time duration between the falling edge transitions of the two signals ZVX1 and ZVX2.

Figure 4:
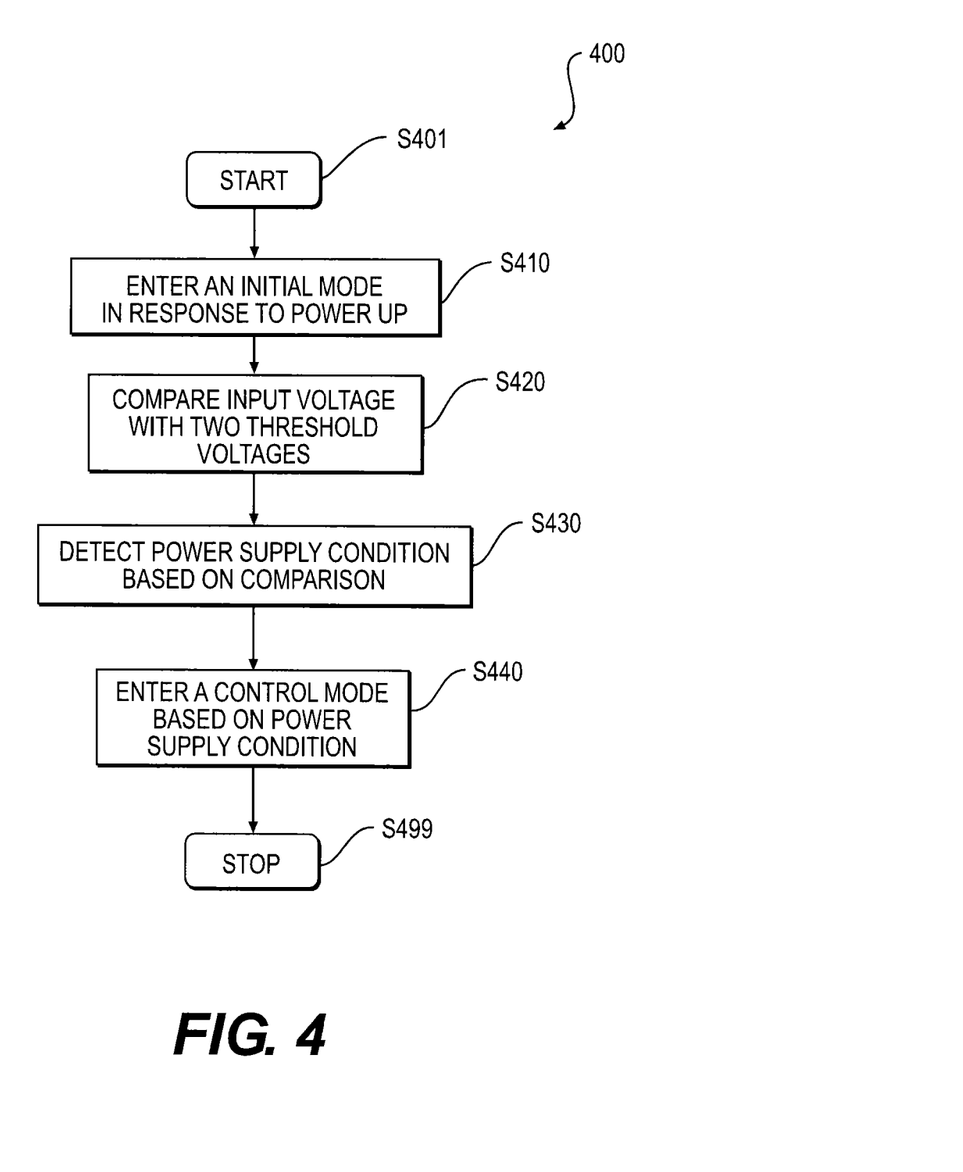
FIG. 4 shows a flowchart outlining a process example according to an embodiment of the disclosure.

FIG. 4 shows a flowchart outlining a process example 400 executed by the circuit 110 according to an embodiment of the disclosure. The process starts at S401 and proceeds to S410.

At S410, the electronic system 100 is powered up, and the controller 130 enters an initial control mode. In an example, in the initial control mode, the controller 130 generates a PWM signal according to the first algorithm, which is based on using a constant peak current to drive the energy transfer module 110 to enable the operations of the dimmer 102 assuming the dimmer 102 exists. In addition, in the initial control mode, the controller 130 generates the PWM signal in a manner to provide relatively low power to help a pop on start situation when the dimmer 102 is at a low dimming position.

At S420, the detector 140 compares an input voltage, such as the rectified voltage $V_{RECT}$ with two threshold voltages. In an example, the controller 130 generates a first signal ZVX1 based on a comparison of the rectified voltage $V_{RECT}$ with a first threshold voltage V1 and generates a second signal ZVX2 based on a comparison of the rectified voltage $V_{RECT}$ with a second threshold voltage V2.

At S430, the controller 130 detects the power supply condition based on the comparisons. In an example, the time duration between the rising edge transitions or falling edge transitions of the first signal ZVX1 and the second signal ZVX2 is a function of the line voltage. Thus, the line voltage can be determined based on the time duration. Further, the existence of the TRIAC type dimmer 102 can also be detected based on the time duration.

At S440, the controller 130 switches to an operation mode corresponding to the determined power supply. Then the process proceeds to S499 and terminates.

Figure 5:
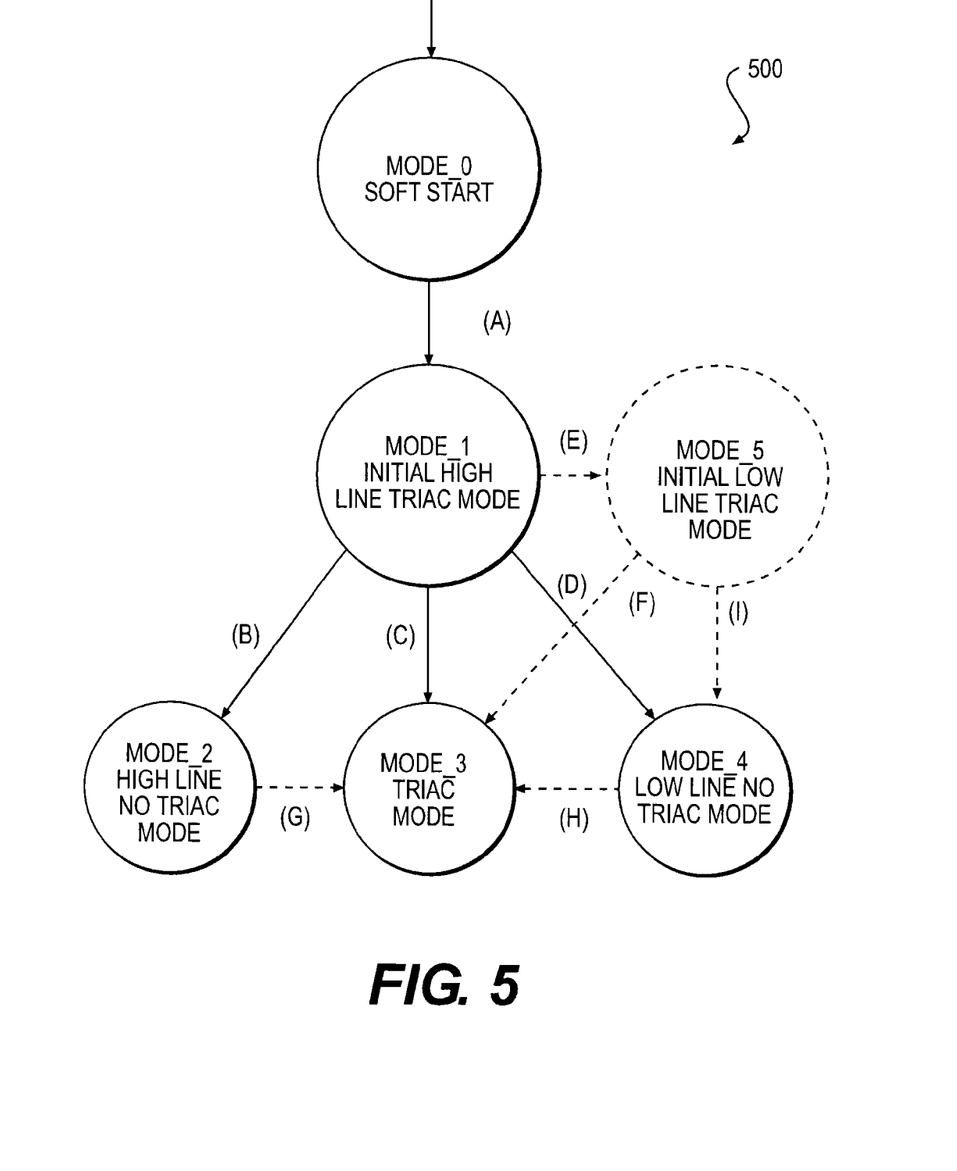
FIG. 5 shows a plot of a finite state machine example according to an embodiment of the disclosure.

FIG. 5 shows a plot of a finite state machine example 500 according to an embodiment of the disclosure. The finite state machine 500 can be implemented in the controller 130 to switch to suitable operation modes.

The finite state machine 500 includes six modes MODE_0 to MODE_5.

The MODE_0 is an entry mode. At a power up, the finite state machine 500 enters the MODE_0. According to an aspect of the disclosure, the circuit 110 is also powered from the power supply. In an example, the electronic system 100 includes a capacitor (not shown) configured to be charged by, for example, the rectified voltage $V_{RECT}$, and to provide a supply voltage VDD to the circuit 110 to enable the operation of the circuit 110. In the MODE_0, the capacitor is charged up. When conditions (A) are satisfied, the circuit 110 enters MODE_1. In an example, the conditions (A) include at least the voltage over the capacitor being larger than a threshold, such as 75% of a value defined for the supply voltage VDD.

In the MODE_1, the controller 130 assumes that the AC power supply 101 is a high line voltage and a TRIAC type dimmer 102 exists. The controller 130 is configured to enable operations of the electronic system 100 under the assumed power supply. In an example, the controller 130 generates a PWM signal according to the first algorithm, which is based on using a constant peak current to drive the energy transfer module 110 to enable the operations of the dimmer 102 assuming the dimmer 102 exists.

In the MODE_1, the controller 130 detects the line voltage of the AC power supply 101 and detects whether the dimmer 102 exists. In an example, the detector 140 generates two signals ZVX1 and ZVX2 by comparing an input voltage from the power supply, such as the rectified voltage $V_{RECT}$, with two threshold voltages. The controller 130 then determines the attributes of the power supply based on a time duration between rising edge transitions and/or falling edge transitions of the two signals ZVX1 and ZVX2. The controller 130 enters the MODE_2 when conditions (B) are satisfied, enters the MODE_3 when conditions (C) are satisfied, and enters the MODE_4 when conditions (D) are satisfied.

In the MODE_2, the controller 130 is configured to enable operations of the electronic system 100 under a high line voltage without TRIAC. In an embodiment, the conditions (B) include $$\left| \frac{t_2 - t_1}{T_{Half_{cycle}}} \right|_{<0.036}$$

and |t2−t1|>3.2 µs for both rising edge transitions and falling edge transitions. In an example, the controller 130 includes a high frequency clock and a counter that counts a number of clock cycles between rising edge transitions (or failing edge transitions) of the two signals ZVX1 and ZVX2. The controller 130 then uses the number of clock cycles as the time duration to determine whether the conditions (B) are satisfied. It is noted that the conditions (B) can include other suitable conditions. In an example, the controller 130 calculates a dimming ratio, and conditions (B) includes a condition for dimming ratio.

In the MODE_3, the controller 130 is configured to enable operations of the system 100 under a power supply with a TRIAC. The power supply can be high power supply or can be low line power supply. In an embodiment, the conditions (C) |t2−t1|<3.2 µs for one of rising edge transitions or falling edge transitions. It is noted that the conditions (C) can include other suitable conditions. In an example, the conditions (C) include a condition for the dimming ratio.

In the MODE_4, the controller 130 is configured to enable operations of the electronic system 100 under a low line voltage without TRIAC. In an embodiment, the conditions (D) include $$\left| \frac{t_2 - t_1}{T_{Half_{cycle}}} \right|_{>0.045}$$

for both rising edge transitions and falling edge transitions.

It is noted that the finite state machine 500 can include other suitable mode. In an example, the finite state machine 500 includes a MODE_5. In the MODE_5, the controller 130 assumes that the AC power supply 101 is a low line voltage and a TRIAC exists. The controller 130 is configured to enable operations of the system 100 under the assumed power supply. In an example, conditions (E) include none of the conditions (B), (C) and (D) being satisfied. When the conditions (E) are satisfied, the controller 130 enters the MODE_5.

It is noted that, in an embodiment, when the controller 130 is one of the MODE_2, the MODE_4 and the MODE_5, and |t2−t1|≤3.2 µs, as shown by conditions (G), (H) and (F), the controller 130 enters the MODE_3. It is also noted that when the controller 130 is in MODE_5, and during a predetermined time interval, the condition (F) has not been satisfied, as shown by conditions (I), the controller 130 enters the MODE_4 by default.

Figure 6:
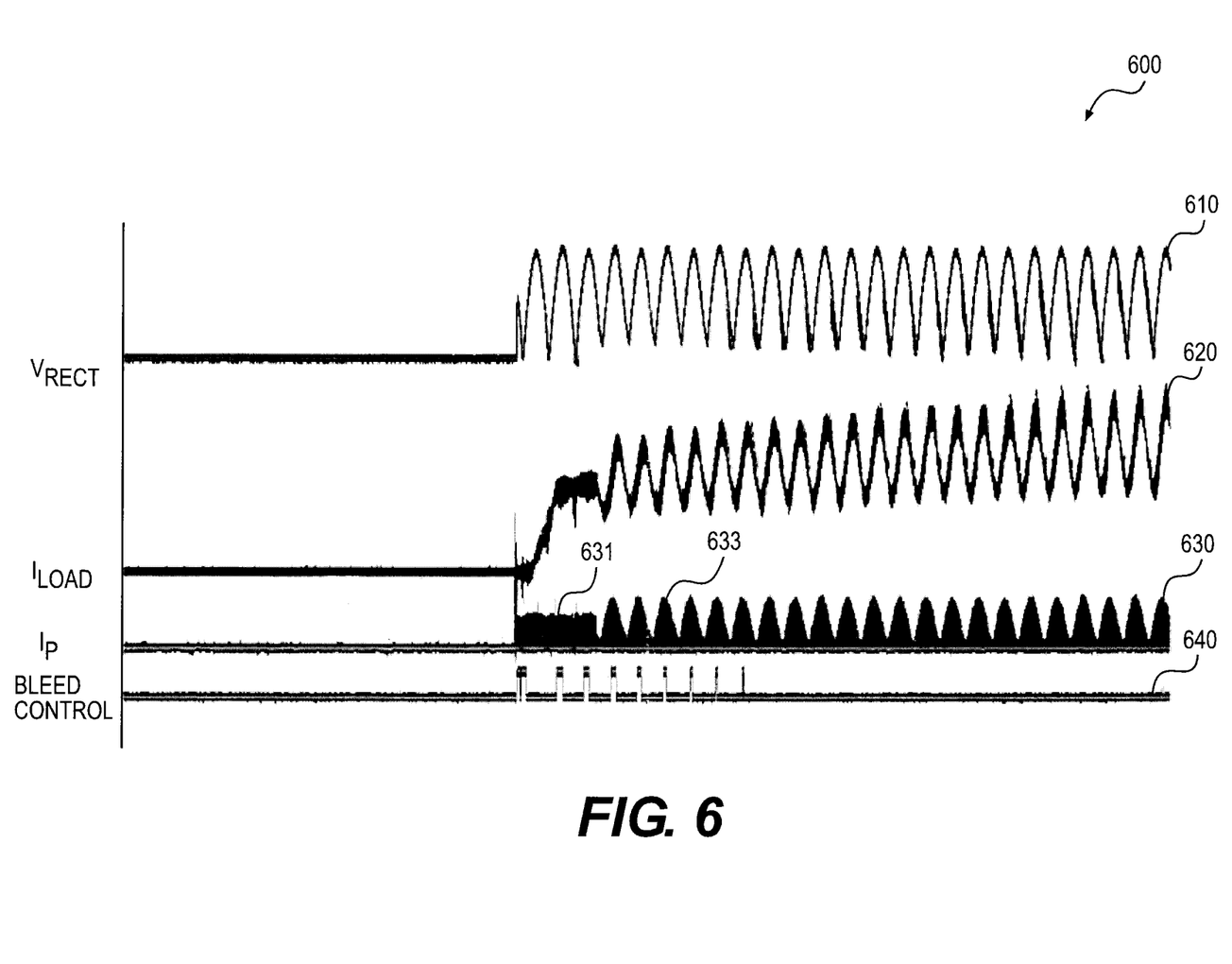
FIGS. 6 and 7 show waveforms of an electronic system according to an embodiment of the disclosure.

FIG. 6 shows a plot 600 of simulation waveforms for the electronic system 100 with 230V AC power supply and without a dimmer 102. The plot 600 includes a first waveform 610 for the rectified voltage $V_{RECT}$, a second waveform 620 for the load current $I_{LOAD}$, a third waveform 630 for the current $I_P$, and a fourth waveform 640 for a bleed control signal in the electronic system 100 that is used to enable a bleeding path when the TRIAC is in the off state.

At a power up, such as during the first three half AC cycles, the controller 130 is in the initial control mode 150 and the electronic system 100 is in an operation mode to support the operations of the dimmer 102 assuming the dimmer 102 exists. In the initial control mode 150, the controller 130 generates the PWM signal to turn on and off the switch $S_T$ to maintain a relatively constant peak current, as shown by 631. Further, in the initial control mode 150, the controller 130 determines the power supply attributes.

In the FIG. 6 example, the controller 130 detects that the power supply is a high line power supply without a TRIAC type dimmer. Then, the controller 130 enters the operation mode 160 for high line no TRIAC power supply. The electronic system 100 then operates in the second operation mode to improve energy efficiency. In an example, the average current $I_P$ has about the same phase as the rectified voltage $V_{RECT}$, as can be seen by 633, and the energy efficiency can be improved.

Figure 7:
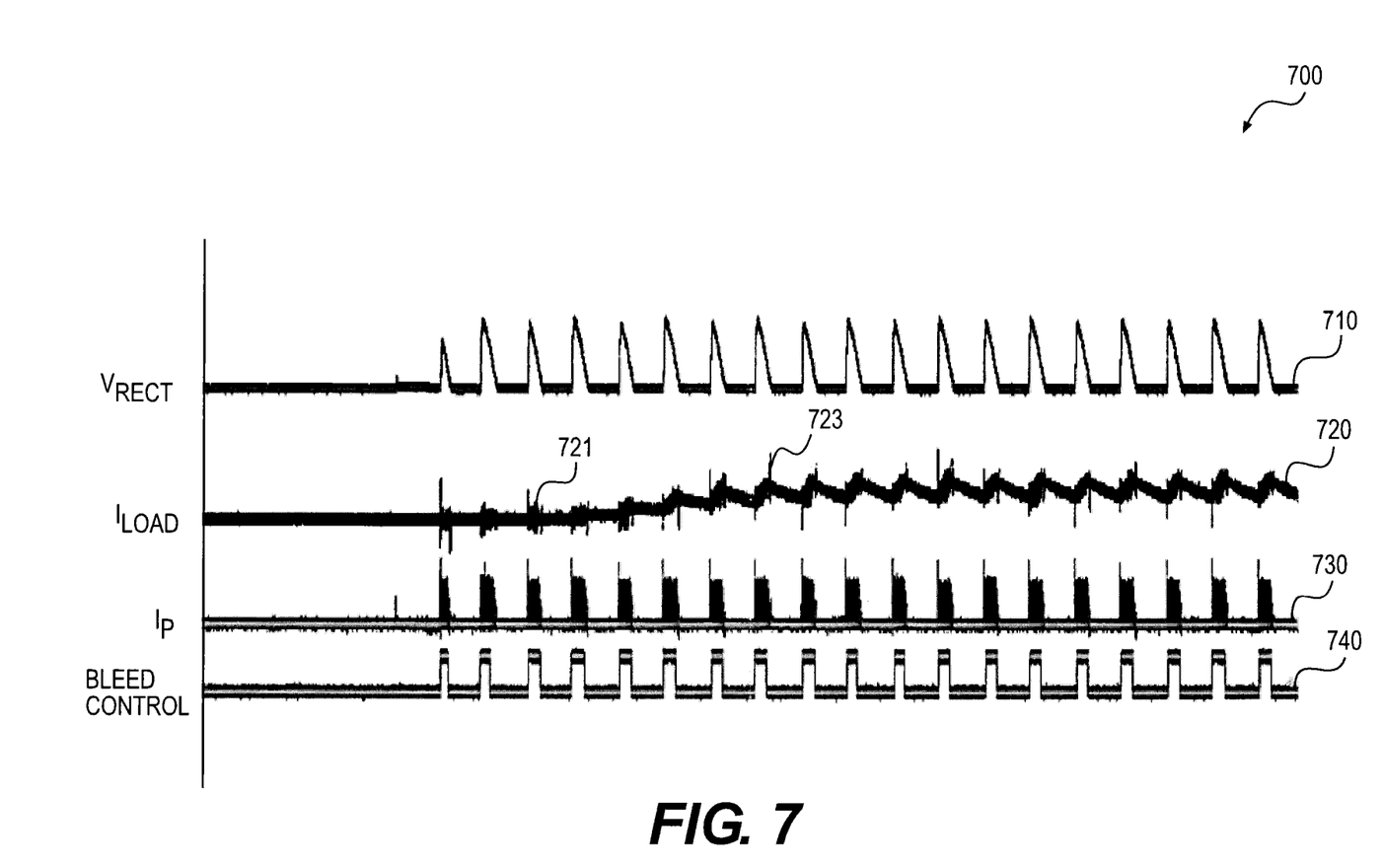

FIG. 7 shows a plot 700 of simulation waveforms for the electronic system 100 with 120V AC power supply and with a dimmer 102. At a power up, such as during the first three half AC cycles, the controller 130 is in the initial control mode 150 and the electronic system 100 is in an operation mode to support the operations of the dimmer 102 assuming the dimmer 102 exists. In the initial control mode 150, the controller 130 generates the PWM signal to turn on and off the switch $S_T$ to maintain a relatively constant peak current. In an example, in the initial operation mode 105, the controller 130 uses a relatively low frequency to lower driving power for driving the load as shown by 721. Further, in the initial control mode 150, the controller 130 determines the power supply attributes. In the FIG. 7 example, the controller 130 detects that the power supply is a low line power supply with a TRIAC type dimmer. Then, the controller 130 enters the operation mode 160 for TRIAC power supply. The controller 130 can gradually increase the frequency of the PWM signal to match the setting of the TRAIC type dimmer 102, and the driving power for the load increases as shown by 723.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving an input voltage rectified from an alternating current (AC) power supply;
   detecting a time duration that the input voltage is between a first threshold voltage and a second threshold voltage;
   determining a line voltage of the AC power supply as a function of a comparison between a threshold value and a ratio of the detected time duration to an AC cycle; and
   regulating a time for turning on a switch to transfer energy via a transformer based on the determined line voltage.

2. The method of claim 1, further comprising:
   regulating the time for turning on the switch to transfer energy via the transformer at a power up based on an assumption that the AC power supply is a high line AC power supply with a dimmer.

3. The method of claim 2, wherein regulating the time for turning on the switch to transfer energy via the transformer at the power up comprises:
   regulating the time for turning on the switch to limit a substantially constant peak current flowing through the switch.

4. The method of claim 3, wherein regulating the time for turning on the switch to limit the substantially constant peak current flowing through the switch further comprises:
   generating pulse width modulated pulses based on a sensed current.

5. The method of claim 1, wherein determining the line voltage of the AC power supply comprises:
   determining the line voltage to be a high line voltage when the ratio is lower than a first value; and
   determining the line voltage to be a low line voltage when the ratio is higher than a second value that is higher than the first value.

6. The method of claim 1, further comprising:
   determining whether a dimmer exists based on the time duration.

7. The method of claim 6, wherein determining whether the dimmer exists based on the time duration further comprises:
   determining that the dimmer exists when the time duration is smaller than a threshold.

8. A circuit comprising:
   a detector configured to receive an input voltage rectified from an alternating current (AC) power supply, and detect a time duration that the input voltage is between a first threshold voltage and a second threshold voltage; and
   a controller configured to determine a line voltage of the AC power supply as a function of a comparison between a threshold value and a ratio of the detected time duration to an AC cycle and regulate a time for turning on a switch to transfer energy via a transformer based on the determined line voltage.

9. The circuit of claim 8, wherein the controller is configured to regulate the time for turning on the switch to transfer energy via the transformer at a power up based on an assumption that the AC power supply is a high line AC power supply with a dimmer.

10. The circuit of claim 9, wherein the controller is configured to regulate the time for turning on the switch to limit a substantially constant peak current flowing through the switch at the power up.

11. The circuit of claim 10, wherein the controller is configured to generate pulse width modulated pulses based on a sensed current.

12. The circuit of claim 8, wherein the controller is configured to determine the line voltage to be a high line voltage when the ratio is lower than a first value and to determine the line voltage to be a low line voltage when the ratio is higher than a second value that is higher than the first value.

13. The circuit of claim 8, wherein the controller is configured to determine whether a dimmer exists based on the time duration.

14. The circuit of claim 13, wherein the controller is configured to determine that the dimmer exists when the time duration is smaller than a threshold.

15. An apparatus comprising:
   an energy transfer module configured to transfer electric energy from an alternating current (AC) power supply to an output device;
   a detector configured to receive an input voltage rectified from the AC power supply, and detect a time duration that the input voltage is between a first threshold voltage and a second threshold voltage; and
   a controller configured to determine a line voltage of the AC power supply as a function of a comparison between a threshold value and a ratio of the detected time duration to an AC cycle and regulate a time for turning on a switch of the energy transfer module to transfer energy via a transformer based on the determined line voltage.

16. The apparatus of claim 15, wherein the controller is configured to regulate the time for turning on the switch to transfer energy via the transformer at a power up based on an assumption that the AC power supply is a high line AC power supply with a dimmer.

17. The apparatus of claim 16, wherein the controller is configured to regulate the time for turning on the switch to limit a substantially constant peak current flowing through the switch at the power up.

18. The apparatus of claim 17, wherein the controller is configured to generate pulse width modulated pulses based on a sensed current.

19. The apparatus of claim 15, wherein the controller is configured to determine the line voltage to be a high line voltage when the ratio is lower than a first value and to determine the line voltage to be a low line voltage when the ratio is higher than a second value that is higher than the first value.

20. The apparatus of claim 15, wherein the controller is configured to determine an existence of a dimmer when the time duration is smaller than a threshold.

* * * * *